Oct. 9, 1962 M. COE 3,057,637
EASY GARDENING SEAT CART
Filed March 19, 1962
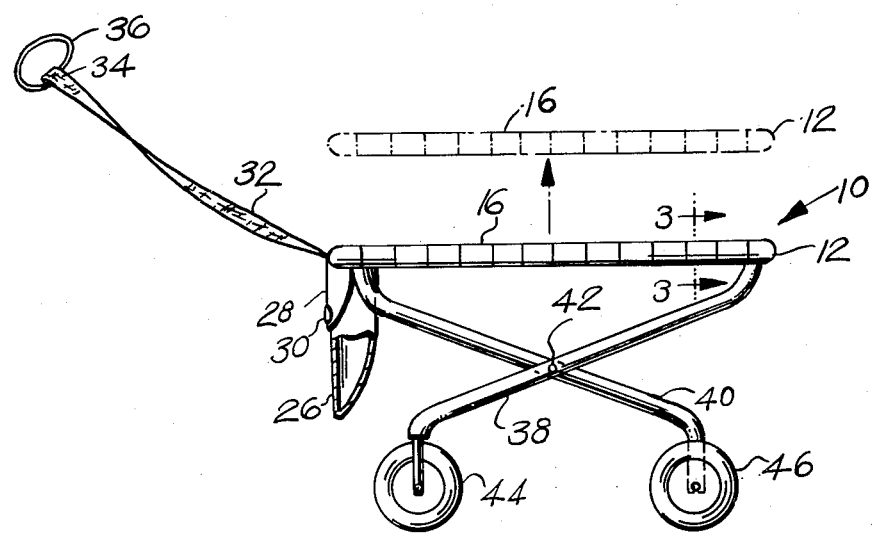
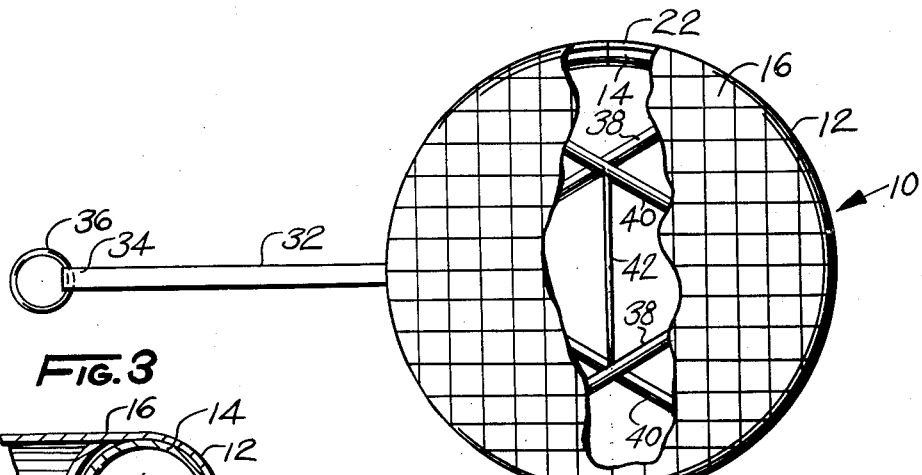
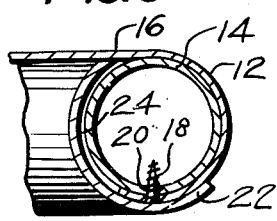
INVENTOR.
MARY COE

United States Patent Office 3,057,637
Patented Oct. 9, 1962

3,057,637
EASY GARDENING SEAT CART
Mary Coe, 1250 S. Hanson St., Philadelphia 43, Pa.
Filed Mar. 19, 1962, Ser. No. 180,675
4 Claims. (Cl. 280—41)

This invention relates to combination seats, and more particularly, to combination seats for use in gardening.

It is an object of the present invention to provide a gardening seat cart that will substantially reduce leg and back strain while bending down weeding and planting.

Another object of the present invention is to provide a gardening seat cart that can be pulled from one spot to another with a minimum of effort.

Another object of the present invention is to provide a gardening seat cart that is handy as a foot stool, a pull cart for clothes baskets or other objects.

A further object of the gardening seat cart is to provide a gardening seat cart that is easily folded for storage.

Other objects of the invention are to provide a gardening seat cart bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side view comprising the present invention, and shown in elevation, and partly broken away;

FIGURE 2 is a top plan view of FIGURE 1; and

FIGURE 3 is a view taken on the lines 3—3 of FIGURE 1.

Referring now more in detail to the drawing, a gardening seat cart 10, made in accordance with the present invention, is shown to include a circular seat 12, having a tubular frame 14, with a flexible covering 16 secured thereto by screws 18, which are threadingly received therewithin in openings 20 equally spaced apart therethrough. A circular ring 22 frictionally receives seat 12 therewithin its arcuately contoured opening 24. A pouch 26 having a flap 28 and a snap fastener 30, is fixedly secured thereto the front of gardening seat cart 10, and depends downwardly therefrom. A rear belt 32 is fixedly secured centrally thereof the front of seat 12 at one end, and at the other end is formed a loop 34 which receives finally therewithin a pull ring 36 of oval configuration. A pair of spaced apart legs 38 are fixedly secured therebeneath ring 22 rearwardly of cart 10, and a pair of spaced apart tubular legs 40 are secured therebeneath ring 22 forwardly of cart 10 and are pivotably received by cross-bar 42. A pivotable wheel 44 is secured therebeneath each leg 38 and a non-pivotable wheel 46 is secured to each of the legs 40. In operation, the legs 38 and 40 are unfolded from each other and the circular halves of ring 22 align with each other, and frame 14 is placed therewithin the arcuate contour 24 of ring 22, and the cart may be pulled by ring 36 on belt 32, which is attached to the cart 10, to any suitable spot, and an individual may sit on the seat 12, and lean over with a minimum of effort to do his gardening. Pivotable wheels 44 allow easy maneuverability of the cart 10, and the pouch 26 may be used for various small objects. When the cart 10 is not in use, it may be folded up for storage, by pushing upwardly with the hand against the bottom surface of the cover 16, thus lifting frame 14 from the ring 22, and the legs 38 and 40, pivotable on cross-bar 42, are easily folded for minimum storage space.

While various changes may be made in the detail construction, it shall be understood that such changes shall be within the spirit and scope of the present invention as defined by the appended claims.

What I claim as new and desire to protect by Letters Patent of the United States is:

1. A gardening seat cart comprising, in combination, a seat, a circular ring diagonally cut, receiving said seat, a plurality of folded legs secured therebeneath said seat, said legs receiving at their lower ends a plurality of wheels, a pouch means depending therefrom, a belt secured to said ring.

2. A combination, according to claim 1, wherein said ring is halved, and a separation of said halves is in alignment with a cross-bar, and said cross-bar pivotably receive said legs for folding said cart for storage.

3. A combination, according to claim 2, wherein the legs projecting forward of said cart freely receive a pivotable wheel therewithin for easy maneuvering of said cart.

4. A combination, according to claim 3, wherein said pouch depending therefrom said ring is forward of said pivotable wheels and a belt of substantially elongated and flexible material is secured centrally thereof the forward end of said cart to said ring and gripping means is provided at its other end by a substantially oval ring freely received by a loop in said forward end of said belt.

No references cited.